455-617 AU 233 EX
FIP8106 XR 3,020,398
REFERENCE EXAMINER

Feb. 6, 1962 C. M. HYDE 3,020,398

SIDEBAND INTERMEDIATE FREQUENCY COMMUNICATIONS SYSTEM

Filed April 15, 1960

INVENTOR
CLYDE M. HYDE
BY Stowell & Stowell
ATTORNEYS

United States Patent Office 3,020,398
Patented Feb. 6, 1962

3,020,398

SIDEBAND INTERMEDIATE FREQUENCY COMMUNICATIONS SYSTEM

Clyde M. Hyde, Lincoln, Nebr., assignor to Research Corporation, New York, N.Y., a corporation of New York Filed Apr. 15, 1960, Ser. No. 22,532
5 Claims. (Cl. ~~250—6~~) 325-49

Figure 1:
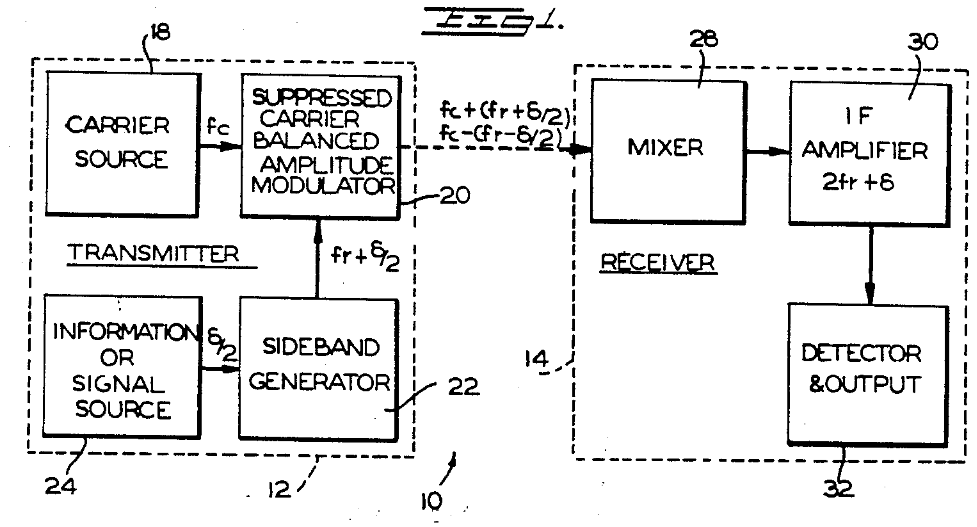

The present invention relates to sideband intermediate frequency communications systems and, more particularly, relates to improved communications systems, which include a transmitter as well as a receiver which are coupled by a transmission means or medium, and in which the transmitter generates for transmission through the medium, a new and improved radio signal, i.e., sideband intermediate frequency signals. Thus, conventional receivers and receiving systems would be relatively insensitive to these signals, and it is found that the receiver contemplated in the invention is simpler than existing receiving systems and has advantages not possessed by existing receiving systems.

The improvements in communications systems are generally adapted to using existing and conventional types of radio signals for transmission and reception at the receiver or receiving system of the communication systems. In the present invention, the transmitter uses a different type of radio signal; the transmitter of the invention uses what may be referred to as a double modulation system while, as is well known, most present transmitters apply the information or signals to be transmitted directly to the carrier with a single modulator. Double modulation systems are known generally, and are referred to as sub-carrier transmission systems.

In all sub-carrier transmission systems, the carrier is generally transmitted without suppression. In conventional communications systems the sub-carrier frequency is generally proportionately lower than it is in sideband frequency communications systems, and the existing sub-carrier systems are primarily designed to provide more efficient use of the carrier energy than is possible in a single modulation transmitting system.

The radio communications system of the invention eliminates high frequency oscillator frequency drift problems by using an amplitude modulated transmitter that is modulated with a low frequency oscillator tuned to one-half of the intermediate frequency of the receiver. At the receiver in the communications system, the two sidebands are beat together, or against each other, to produce an intermediate frequency signal without introducing a carrier signal, to cause the radio signal to be restored to its original amplitude modulation type wave. In the system of the invention there is no need for a receiver local oscillator for providing a carrier signal.

The high frequency carrier oscillator of the transmitter in the radio communications system does not have to be stabilized at a fixed frequency. In some instances, it may be made to be intentionally unstable in frequency. Random high frequency sources and incoherent or intermittent frequency energy sources may be the high frequency carrier sources.

The possibility of using a variable high frequency carrier oscillator in the transmitter of the sideband intermediate frequency system suggests solutions to the oscillator frequency stability problems that are inherent in conventional and existing ultramicrowave and infrared communications systems. An optical frequency communications system which enjoys the advantages of high sensitivity, comparable to that of the superheterodyne receiver, is also possible.

Another advantage of the sideband intermediate frequency system readily adapts itself to use in communicating with very high speed missiles or vehicles where the Doppler frequency shift due to the motion thereof introduces the problem of frequency shift of the received transmissions.

Since the sideband intermediate frequency communications system is a complete system, it includes a transmitter and a receiver. It has been found that with some modifications, the system can utilize certain existing receiving systems and transmitting systems which provide definite advantages. In the sideband intermediate frequency system, the information to be transmitted modulates the sideband generator which in turn modulates the carrier signal. In the invention the sideband generator modulates the carrier signal in such a way that the two resulting sidebands are separated by the intermediate frequency of the sideband intermediate frequency receiver. The sideband generator in turn may be modulated by any conventional means. Definite advantages may be obtained by using different types of sideband generator modulation, such as eliminating the carrier and allowing energy to be propagated at the two sideband frequencies.

It is within the scope of the present invention to use the sideband intermediate frequency system to provide more power, in a relative degree, for use in multiplexing services of commercial frequency modulation radio stations. Also the receiver system of the invention may solve many difficulties which currently face the users of multiplexing converters.

Figure 2:
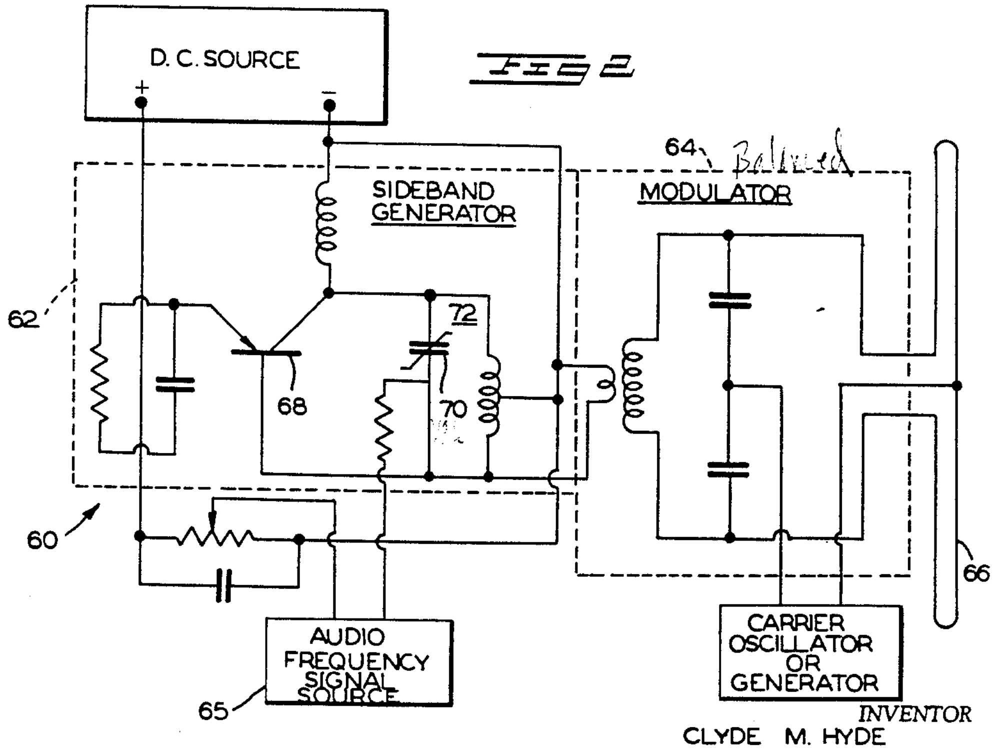

These as well as further advantages which are inherent in the invention will become apparent from the following description, reference being had to the accompanying drawing wherein:

FIG. 1 is a block diagram of the sideband intermediate frequency communications system in accordance with a preferred embodiment of the present invention; and FIG. 2 shows a schematic circuit diagram of very high frequency sideband intermediate frequency transmitter according to the present invention.

Referring now to FIG. 1, there is shown a communications system 10 including a transmitter 12 and a receiver 14. As is well known, the transmitter and the receiver are connected by any conventional transmission medium, including any wire or wireless means (not shown). The transmitter includes a carrier frequency power source 18 that provides a carrier frequency $f_c$. The carrier frequency $f_c$ is coupled to a suppressed carrier balanced amplitude modulator 20, which is modulated with an oscillator or sideband generator 22 that is tuned to one half of the intermediate frequency of the receiver 14, which is described in further detail below. As is well known the balanced amplitude modulator eliminates the carrier frequency and there is propagated therefrom through a transmission medium only the energy of the two sideband frequencies. The sideband generator 22 is modulated or controlled by an information or signal source 24 which provides a signal $\delta/2$. Therefore, it is apparent that the output of the sideband generator 22 is the frequency of the sideband generator, $f_r$ together with the signal $\delta/2$.

The two sideband frequencies that emanate from the balanced amplitude modulator 20 are defined as sideband frequencies $f_c+(f_r+\delta/2)$ and $f_c-(f_r+\delta/2)$.

At the receiver 14 these two sideband frequencies are beat together or against each other in mixer 28 to produce the intermediate frequency signal $2f_r$ from the mixer 28. The frequency $2f_r$ is coupled to the intermediate frequency amplifier 30 and thence to a detector and output device 32 which provides a derived signal of the original information or signal $\delta/2$.

There is no local oscillator in the receiver and, therefor, local oscillator frequency drift problems are eliminated. Since there is only one high frequency oscillator or carrier frequency source 18, the frequency shift problems are reduced to those of the low frequency oscillators.

As will be shown below the received information is independent of the carrier frequency. The overall efficiency of the sideband intermediate frequency communications system can be quite high when the balanced modulator incorporates reactive non-linear elements. In the event that the carrier frequency power is divided equally between each of the two sidebands, little or no modulating power is found to be required. A reactive modulator is found to have an efficiency which approaches 100% while a non-linear resistive modulator is at most 50% efficient.

The frequency energy output of the modulator consists of two sidebands which are at frequencies of $f_c+f_r$ and $f_c-f_r$, where $f_c$ is the carrier frequency and $f_r$ is the sideband oscillator or generator frequency. The sideband frequency energy contains all of the information or signal which was superimposed upon the output of the sideband generator 22. The carrier frequency energy arrives or is received at the mixer 28 of the receiver 14 at each of the two different frequencies. One component of the incoming frequency energy is at a frequency $f_c+f_r$ and the other is at $f_c-f_r$. These two components of frequency are combined in the mixer 28 and for significant output current components, representing the sum, difference, and two original frequencies, are derived and are: $2f_c$, $2f_r$, $f_c+f_r$ and $f_c-f_r$. It is noted that the "difference frequency" is at a frequency of $2f_r$, which is twice the sideband oscillator or generator frequency, $f_r$ produced in the sideband generator 22. The difference frequency power is amplified by the intermediate frequency amplifier 30 while all other components as mentioned above are rejected by bandpass filters (not shown) of the intermediate frequency amplifier.

The intermediate frequency signal of the receiver is a difference frequency signal that is generated as a result of combining the two sidebands of the transmitter in the mixer of the receiver. The frequency difference between these two sidebands is determined by the frequency of the sideband oscillator or generator 22 in the transmitter. The frequency of the sideband generator is one half that of the intermediate frequency amplifier 30 of the receiver. The receiver intermediate frequency voltage, that is generated in this manner, has some properties which are different from the ordinary intermediate frequency signal produced by receivers. The two most notable differences are (1) that the amplitude of the intermediate frequency voltage in the ordinary or conventional superheterodyne system is directly proportional to the amplitude of the incoming signal. The amplitude of the intermediate frequency voltage in the sideband intermediate frequency system varies as the product of the amplitude of the two incoming signal voltages; and (2) if the sideband oscillator and the balanced modulator 20 is frequency modulated, that is, if the sideband oscillator frequency is $f_r\pm(\delta/2)$, where $(\delta/2)$ is the frequency deviation, then the intermediate frequency of the receiver will vary by twice the deviation of the sideband oscillator frequency, or simply by $\delta$. To obtain an intermediate frequency amplifier signal in a receiver with a frequency deviation of $\delta$ in any conventional system requires the use of a spectral bandwidth of $\delta$. To obtain the same deviation, $\delta$, in the sideband intermediate frequency system, then each transmitted sideband frequency requires a spectral bandwidth of $\delta/2$. However, since two sidebands are transmitted, the total bandwidth used in the sidebands intermediate frequency communications system is $\delta$, which is the same as in conventional systems.

The sideband generator 22 may be modulated in any conventional manner. The signal from the signal source 24 that is fed thereto may be amplitude modulated, pulse modulated, or may be a single sideband signal, and, as was discussed above the signal may be frequency modulated.

The frequency modulation of the sideband generator signal is shown to appear in the intermediate frequency amplifier 30 of the receiver with twice the original frequency variation or deviation. This is comparable to doubling the information voltage, and results in a six db gain.

The effect of variations in the amplitude of the carrier frequency may be eliminated by using limiters (not shown) in the intermediate frequency amplifier stages of the receiver, assuming that the amplitude does not go to near zero values. As pointed out above, carrier frequency modulation is completely eliminated in the circuit of the receiver 14, only the sideband generator frequencies being modulated. Since the carrier frequency is not modulated, it is evident that the carrier signal may be supplied from a noise source which has or may have random frequency distribution, with no resulting serious degradation of the transmitted information. Likewise incoherent electromagnetic radiators, such as optic or infrared devices, may be used as the carrier frequency source. An optical or an infrared detector then would be used to replace the mixer 28 in FIG. 1.

Mixers and modulators capable of demodulating or modulating infrared and optical energy at frequencies of 30 to 100 megacycles may pose a problem. However, Kerr cells are capable of switching at rates of $10^{-9}$ seconds.

A sideband intermediate frequency transmitter 60 for use in the very high frequency region in which the carrier frequency is in the neighborhood of 120 mc./s. is shown in FIG. 2. In this form of the invention a sideband oscillator or generator 62, which supplies the amplitude modulation signal for a balanced modulator 64, is operated at a frequency of 5.35 mc./s. The sideband generator is modulated in frequency by an audio frequency signal source 65.

The output of the balanced modulator is connected to a resonant folded dipole antenna 66, which serves as the radiating element for the two sideband frequencies. The sideband generator is a frequency modulated transistor oscillator 68 operating at a center frequency of 5.35 mc./s. The audio information voltage is applied to a silicon non-linear capacitor 70 to obtain frequency modulation thereof and which is connected across the frequency controlling circuit 72 of the 5.35 mc./s. sideband generator. The output power of the carrier generator is approximately 200 milliwatts.

The receiver for use with the transmitter 60 is not shown, but may consist of a resonant circuit, broadly tuned to the carrier frequency of 120 mc./s., coupled to a simple crystal diode mixer. The output of this simple crystal diode mixer is connected to a 10.7 mc./s. intermediate frequency amplifier of a commercial frequency modulation receiver.

The sideband intermediate frequency communications system eliminates oscillator frequency drift problems which are inherent in ordinary and conventional communications system operating at high frequencies. The only effect of oscillator frequency drift in the system of the invention is one of the second order. As long as the transmitter oscillator frequency remains within the passband of the antenna system and of the tuned input circuit of the receiver, communications are not impaired. The simplicity of the receiver has a decided advantage over the superheterodyne receiver. Only a simple diode mixer needs to be added to an intermediate frequency amplifier. The theoretical signal-to-noise ratio, the selectivity, and the gain per stage of this system is comparable to that of the superheterodyne receiver. Conventional equipment can be adapted to utilize the advantages of the communications system of the invention by adding components such as a balanced modulator and a sideband oscillator or generator to the transmitter. In a high power transmitter, it would be desirable to operate the balanced modulator and the sideband generator at low carrier power levels. The resultant sideband powers may be amplified in conventional carrier type amplifiers.

In the microwave region conventional amplifiers may be either traveling wave tubes or klystrons. When using the systems in higher frequency regions, such as ultra microwave, infrared, or optic, for example, the limitations of conventional equipment deters the use of low level modulation. Frequency modulation of the sideband generator allows the receiver to be equipped with conventional frequency modulation limiters or other noise reducing stages which increase the signal-to-noise ratio at the output.

The communications system of the invention is also useful in lower frequency portable equipment where the oscillator frequency drift problem is often substantial.

One of the advantages of the communications system in arrangements where the frequency shift problem is significant is in communicaiton systems used in conjunction with high speed vehicles, such as satellites, missiles and other space vehicles.

The sideband intermediate frequency receiver may incorporate many of the devices which improve receiver operation, and would be employed in the intermediate frequency amplifier thereof. The communications system may also be used in multiplexing systems of commercial frequency modulation radio stations.

It should be understood, however, that the specific apparatus herein illustrated and described is intended to be representative only, as many changes may be made therein without departing from the principles of the invention. Accordingly, reference should be made to the following claims in determining the full scope of the invention.

I claim:

1. A radio communications system comprising a radio transmitter including a carrier frequency source, a signal source, a sideband generator connected to the output of the signal source, a balanced amplitude modulator connected to the outputs of the carrier frequency source and the sideband generator to produce a carrier suppressed transmission, and a radio receiver for receiving the sideband transmission, said radio receiver including a mixer for combining the two sidebands to produce an intermediate frequency which is an algebraic sum of the two sideband frequencies.

2. A radio communications system comprising a radio transmitter including a carrier frequency source, a signal source, a sideband generator connected to the output of the signal source, a balanced amplitude modulator connected to the outputs of the carrier frequency source and the sideband generator to produce a carrier suppressed transmission, a radio receiver for receiving the sideband transmission, said radio receiver including a mixer for combining the two sidebands to produce an intermediate frequency which is an algebraic sum of the two sideband frequencies, and detection means to derive the signal of the signal source from the intermediate frequency.

3. A radio communications system comprising a radio transmitter including a carrier source, a signal source, a sideband generator having a predetermined frequency and connected to the output of the signal source, an amplitude modulator connected to the outputs of the carrier source and the sideband generator to produce a carrier suppressed dual sideband transmission, a radio receiver for receiving the sideband transmission, said radio receiver including a mixer for combining the two sidebands to produce an intermediate frequency signal of a frequency twice the frequency of the transmitter sideband generator, and detection means to derive the signal of the signal source from the intermediate frequency whereby said intermediate frequency is controlled by the frequency of the sideband generator of the transmitter to eliminate the effect of any Doppler frequency shift imposed upon the two sidebands.

4. A radio communications system comprising a radio transmitter including a carrier frequency source, a signal source, a sideband generator having a predetermined frequency and connected to the output of the signal source, an amplitude modulator connected to the outputs of the carrier source and the sideband generator to produce a carrier suppressed dual sideband transmission, a radio receiver for receiving the sideband transmission, said radio receiver including a mixer for combining the two sidebands against each other to produce an intermediate frequency signal of a frequency twice the frequency of the transmitter sideband generator, an intermediate frequency amplifier for passing and amplifying the produced intermediate frequency and for blocking other derived components produced in the mixer, and detection means to derive the signal of the signal source from the intermediate frequency whereby said intermediate frequency is controlled by the frequency of the sideband generator and the amplitude of the intermediate frequency voltage varies directly as the algebraic product of the amplitude of the two incoming sideband transmissions.

5. A radio communications system comprising a radio transmitter including a carrier source, a signal source, a sideband generator connected to the output of the signal source, an amplitude modulator connected to the outputs of the carrier source and the sideband generator to produce a carrier suppressed dual sideband transmission, each sideband transmission being of substantially the same power, a radio receiver for receiving the transmission, said radio receiver including a mixer for combining the two sidebands to produce an intermediate frequency signal of a frequency twice the frequency of the transmitter sideband generator, and detection means to derive the signal of the signal source from the intermediate frequency whereby said intermediate frequency is controlled by the frequency of the sideband generator to eliminate the effect of any Doppler frequency shift imposed upon the two sidebands.

References Cited in the file of this patent

UNITED STATES PATENTS

| | | |
|---|---|---|
| 2,276,863 | Peterson | Mar. 17, 1942 |
| 2,653,221 | Carnahan | Sept. 22, 1953 |